(12) United States Patent
Cherney et al.

(10) Patent No.: US 10,733,991 B2
(45) Date of Patent: *Aug. 4, 2020

(54) CONSTRUCTION MACHINE MODE SWITCHING WITH VOICE SERVICES

(71) Applicant: Deere & Company, Moline, IL (US)

(72) Inventors: Mark J. Cherney, Dubuque, IA (US); Keith N. Chaston, Dubuque, IA (US); Michael G. Kean, Dubuque, IA (US); Douglas K. Wink, Bettendorf, IA (US); Sean P. West, Dubuque, IA (US); John M. Hageman, Dubuque, IA (US); Scott S. Hendron, Dubuque, IA (US)

(73) Assignee: Deere & Company, Moline, IL (US)

(*) Notice: Subject to any disclaimer, the term of this patent is extended or adjusted under 35 U.S.C. 154(b) by 75 days.

This patent is subject to a terminal disclaimer.

(21) Appl. No.: 15/921,789

(22) Filed: Mar. 15, 2018

(65) Prior Publication Data

US 2019/0198017 A1 Jun. 27, 2019

Related U.S. Application Data

(63) Continuation-in-part of application No. 15/850,285, filed on Dec. 21, 2017.

(51) Int. Cl.
*G10L 15/22* (2006.01)
*G06F 40/279* (2020.01)
(Continued)

(52) U.S. Cl.
CPC ............. *G10L 15/22* (2013.01); *G06F 3/167* (2013.01); *G06F 40/279* (2020.01); *G06F 40/30* (2020.01); *G06F 40/40* (2020.01); *G10L 25/48* (2013.01)

(58) Field of Classification Search
CPC ......... G10L 15/22; G10L 25/48; G06F 17/28; G06F 17/2765; G06F 40/40; G06F 40/30; G06F 3/167
See application file for complete search history.

(56) References Cited

U.S. PATENT DOCUMENTS 6,002,362 A 12/1999 Gudat
7,599,775 B2 * 10/2009 Furuno .................. E02F 9/205
701/29.1

(Continued)

FOREIGN PATENT DOCUMENTS

DE 102014204890 A1 9/2015
DE 102014216982 A1 3/2016
(Continued)

OTHER PUBLICATIONS

German Search Report issued in counterpart application No. 102018219966.3 dated Feb. 26, 2019. (10 pages).
(Continued)

*Primary Examiner* — Sonia L Gay
(74) *Attorney, Agent, or Firm* — Christopher J. Volkmann; Kelly, Holt & Christenson, PLLC

(57) ABSTRACT

A mobile construction machine detects a speech processing trigger. It then performs speech processing (such as speech recognition and natural language understanding, speech synthesis, etc.) based on the detected speech processing trigger, to generate a speech processing result. A control signal generator generates control signals based on the speech processing result. The control signals can be used to control the mobile construction machine, to control another mobile construction machine, to provide information to a remote server location, or to aggregate information from multiple remote server locations.

20 Claims, 9 Drawing Sheets

(51) Int. Cl.
  *G06F 40/40* (2020.01)
  *G06F 40/30* (2020.01)
  *G06F 3/16* (2006.01)
  *G10L 25/48* (2013.01)

(56) References Cited

U.S. PATENT DOCUMENTS

| | | |
|---|---|---|
| 8,688,332 B2 | 4/2014 | Reiners |
| 2002/0150267 A1 | 10/2002 | Furuta |
| 2005/0002354 A1 | 1/2005 | Kelly |
| 2007/0142940 A1 | 6/2007 | Ferguson |
| 2007/0282577 A1 | 12/2007 | Lind |
| 2010/0234072 A1 | 9/2010 | Ambiru |
| 2011/0295460 A1 | 12/2011 | Hunt |
| 2014/0052480 A1 | 2/2014 | Bell et al. |
| 2014/0222436 A1* | 8/2014 | Binder ............... G06F 3/167 704/275 |
| 2015/0242182 A1 | 8/2015 | Mcadam |
| 2017/0004830 A1 | 1/2017 | van der Vlugt |
| 2017/0045367 A1 | 2/2017 | Pari |
| 2017/0169823 A1* | 6/2017 | Neff ............... G10L 15/22 |
| 2018/0058214 A1* | 3/2018 | Berning ............ E01C 23/088 |

FOREIGN PATENT DOCUMENTS

| | | |
|---|---|---|
| DE | 102016006568 A1 | 11/2017 |
| EP | 3202700 A1 | 8/2017 |
| JP | 2002023791 A * | 1/2002 |

OTHER PUBLICATIONS

U.S. Appl. No. 15/850,285, filed Dec. 21, 2017 Application and Figures. 39 pages.

U.S. Appl. No. 15/850,285 Office Action dated Jun. 25, 2019, 19 pages.

* cited by examiner

CONSTRUCTION MACHINE MODE SWITCHING WITH VOICE SERVICES

CROSS-REFERENCE TO RELATED APPLICATION

The present application is a continuation-in-part of and claims priority of U.S. patent application Ser. No. 15/850,285, filed Dec. 21, 2017, the content of which is hereby incorporated by reference in its entirety.

FIELD OF THE DESCRIPTION

The present description relates to mobile construction machines. More specifically, the present description relates to voice control and other voice services in a mobile construction machine.

BACKGROUND

There are many different types of mobile machines. Such machines can include agricultural machines, construction machines, turf management machines, forestry machines, etc.

Many such machines are relatively complicated to operate. Therefore, it can take both hands of an operator in order to perform normal operating functions of the machine. If the operator needs to perform another function (such as to turn on some subsystem of the machine, etc.), the operator often needs to bring the machine to a stop, then turn on that subsystems, and then continue the operation that the operator was conducting with the machine.

In addition, some such machines operate in environments where other machines are closely proximate. For instance, at a construction site, or a logging site, large construction or forestry machines may be operating in relatively close proximity to one another. In addition, machines may be coming and going from the site on relatively narrow roads or pathways.

Further, some such machines are equipped with functionality in which certain parameters may be uploaded to a remote server environment for storage and later analysis. In addition, such machines may be uploading data to different remote server locations, to different databases, or to different storage resources. Therefore, when an individual, such as a manager, wishes to see information related to multiple different machines, or even information from a single machine, the manager must often access multiple different data locations in order to obtain the desired information. This can be cumbersome and it can lead to a computing system with relatively large computing overhead and bandwidth requirements, in order to perform searches on and to return information from, the various data resources.

The discussion above is merely provided for general background information and is not intended to be used as an aid in determining the scope of the claimed subject matter.

SUMMARY

A mobile construction machine detects a speech processing trigger. It then performs speech processing (such as speech recognition and natural language understanding, speech synthesis, etc.) based on the detected speech processing trigger, to generate a speech processing result. A control signal generator generates control signals based on the speech processing result. The control signals can be used to control the mobile construction machine, to control another mobile construction machine, to provide information to a remote server location, or to aggregate information from multiple remote server locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
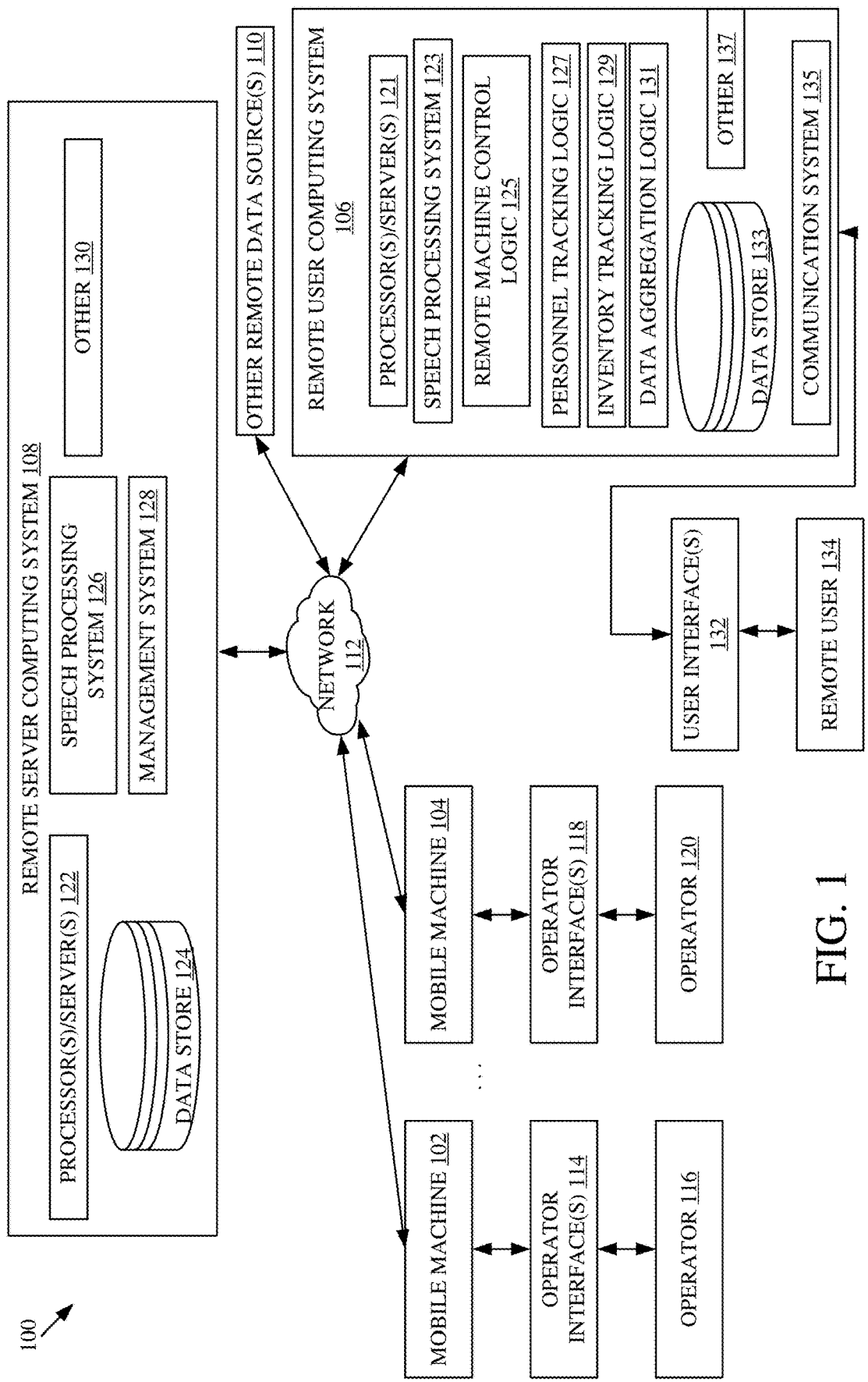
FIG. 1 is a block diagram of one example of a mobile machine computing system architecture.

FIG. 1 is a block diagram of one example of a computing system architecture 100. Architecture 100 illustratively includes mobile machines 102-104 (each of which has its own computing system as described in greater detail below with respect to FIG. 2), remote user computing system 106, remote server computing system 108, and it can include other remote data sources (or stores) 110 and other systems. Machines 102 and 104, computing systems 106 and 108, and data sources 110, are all shown, in the example illustrated in FIG. 1, communicating over network 112. Network 112 can be any of a wide variety of different types of networks, such as a wide area network, a local area network, a cellular communication network, a near field communication network, or any of a wide variety of other networks or combinations of networks.

Mobile machine 102 is shown generating operator interfaces 114 for interaction by operator 116. Operator 116 illustratively interacts through interfaces 114, to control and manipulate mobile machine 102. Operator 116 may also interact through interfaces 114 to control and manipulate portions of remote server computing system 108 and to communicate with mobile machine 104, remote user computing system 106 and other remote data sources 110. Similarly, mobile machine 104 generates operator interfaces 118 for interaction by operator 120. Operator 120 illustratively interacts with mobile machine 104 through interfaces 118 in the same way as operator 116. Examples of user interface mechanisms that can be used in operator interfaces 114 and 118 are also described in greater detail below with respect to FIG. 2.

In the example shown in FIG. 1, remote server computing system 108 illustratively includes one or more processors or servers 122, data store 124, speech processing system 126, management system 128, and it can include other items 130. Processors or servers 122 can implement front end processing which handles interaction and requests from users over network 112. They can also implement back end processing which performs data store operations on data store 124, based upon the requests. For instance, they can perform data management operations, data center operations, website operations, etc.

In addition, the front end processing can provide a front end to access speech processing system 126 which may be hosted by remote server computing system 108. Therefore, if, for instance, operator 116 provides a voice command through a microphone in interface 114, machine 102 may send information representative of the received voice command to remote server computing system 108 which performs speech recognition and natural understanding on the voice input, as a service hosted by system 108. System 108 can then provide the result back to machine 102.

Management system 128 may be accessible, again, through front end processing, by various operators or users shown in FIG. 1, or other users. It illustratively performs data store operations to store information on data store 124, that can be retrieved, reported on, analyzed, or otherwise used by a remote user. Management system 128 may include functionality to perform analysis on that data, or it may include functionality that performs some (or none) of the analysis but calls out to other resources to perform additional analysis, etc.

The items in FIG. 1 can also illustratively access other remote data sources 110 to store or retrieve data. Those sources may include data centers, hosted data storage services, websites, or other data sources.

Remote user computing system 106 can be any of a wide variety of different types of computing systems. It is shown generating user interfaces 132 for interaction by remote user 134. Remote user 134 illustratively interacts with remote user computing system 106 through user interfaces 132 in order to control and manipulate remote user computing system 106 and portions of other items shown in FIG. 1. System 106 can include processor(s) or servers 121, speech processing system 123, remote machine control logic 125, personnel tracking logic 127, inventory tracking logic 129, data aggregation logic 131, data store 133, communication system 135, and it can include a wide variety of other items 137.

In one example, remote user computing system 106 can use speech processing system 123 or access speech processing system 126 so that remote user 134 can use voice commands in order to aggregate data about a plurality of different mobile machines 102-104, through management system 128. Data aggregation logic 131 can use management system 128 to obtain data from data store 124 or other remote data sources 110, and aggregate that data in order to generate results based on a request for data from remote user 134. Thus, in one example, remote user 134 can use voice commands or speech commands to obtain aggregate data from a variety of different remote data sources, without needing to directly access those individual sources, one at a time.

Also, as is described in greater detail below, remote user 134 can use speech commands to control machines 102-104 (using remote machine control logic 125), to track personnel or inventory (using personnel tracking logic 127 and inventory tracking logic 129), or to do a wide variety of other things.

Figure 2:
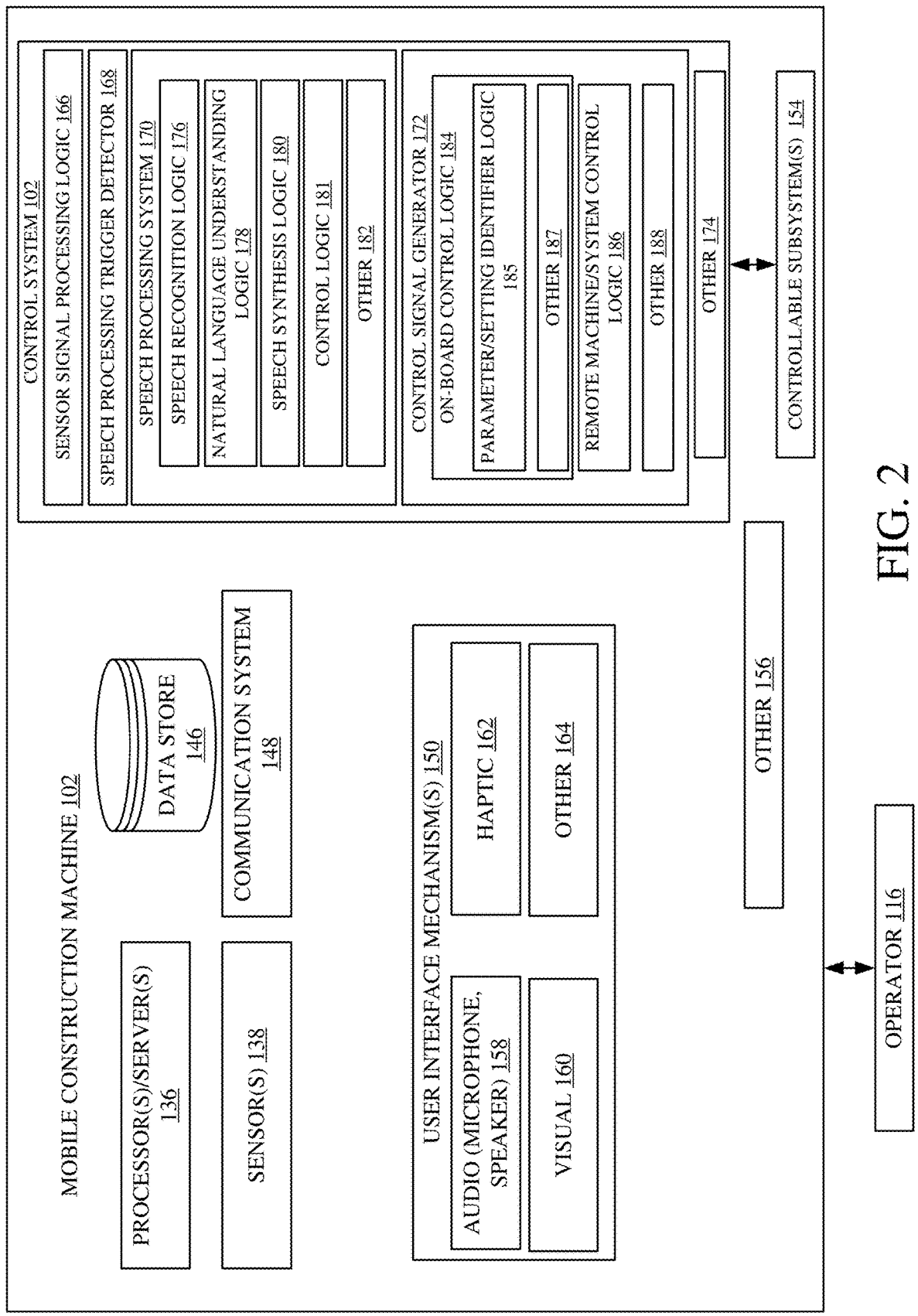
FIG. 2 is a block diagram showing one example of a mobile construction machine in more detail.

FIG. 2 shows a block diagram of one example of a mobile machine 102, in which machine 102 is a mobile construction machine. In the example shown in FIG. 2, mobile construction machine 102 includes one or more processors or servers 136, a variety of different sensors 138, data store 146, communication system 148, user interface mechanisms 150, control system 152, controllable subsystems 154, and it can include a wide variety of other items 156. Before describing the overall operation of mobile construction machine 102 in more detail, a brief overview of some of the items in mobile construction machine 102, and their operation, will first be provided.

Communication system 148 illustratively includes one or more systems that enable items on mobile construction machine 102 to communicate with one another. Such items can include a controller area network (CAN) bus and associated functionality. It also illustratively includes one or more communication systems that allow mobile construction machine 102 to communicate with other machines and other remote systems. Therefore, it can include communication systems that allow mobile construction machine 102 to communicate over network 112 which, itself, can include one or more of the variety of different types of networks discussed above.

User interface mechanisms 150 can include audio interface mechanisms 158, visual interface mechanisms 160, haptic interface mechanisms 162, and a wide variety of other interface mechanisms 164. Audio interface mechanisms 158 can include such things as a microphone, a speaker, bells, audio alarms, etc. Visual user interface mechanisms 160 can include such things as lights, display panels, touch sensitive display mechanisms, etc. The visual user interface mechanisms 160 can also include user interface displays with user actuatable display elements that can be actuated by operator 116 to input commands. For instance, they can include things that are actuatable by a point and click device, by touch on a touch sensitive screen, etc. They can include user actuatable buttons, links, icons, etc.

Haptic user interface mechanisms 162 can include items that provide haptic feedback through other interface mechanisms, such as through a joystick, a steering wheel, a pedal, etc. They can include other haptic interface mechanisms as well.

The other user interface mechanisms 164 can include a wide variety of mechanisms. For instance, they can include things such as steering wheels, joysticks, pedals, linkages, levers, buttons, among others.

Control system 102 illustratively receives various inputs and generates control signals that are provided to controllable subsystems 154, in order to control those subsystems. The inputs to control system 102 may be sensor inputs from one or more sensors 138, user inputs through user interface mechanisms 150, or inputs through other items. The sensors can include a wide variety of different sensors, such as sensors that sense parameters of mobile construction machine 102 (e.g., machine configuration, actuator position(s) engine speed, engine temperature, RPMs, etc.) a position sensor that senses a geographic location of machine 102 (such as a GPS receiver, a dead reckoning system, etc.), or they can include sensors that sense environmental characteristic (such as temperature, soil characteristics, etc.) or a wide variety of other sensors. The controllable subsystems 154 can be subsystems such as a propulsion subsystem, a steering subsystem, actuator subsystems that control actuators on mobile construction machine 102, engine actuators that control engine settings and operational parameters, subsystems that control different user interface mechanisms 150 (such as a subsystem that controls the visual mechanism 160, the audio mechanism 158, etc.), and other subsystems.

It will be noted that, as discussed above, machine 102 can use remote server computing system 108 for speech services. The present discussion, however, proceeds with respect to an example in which machine 102 has its own speech processing functionality, but this is only one example.

In order to generate the control signals, control system 102 illustratively includes sensor signal processing logic 166, speech processing trigger detector 168, speech processing system 170, control signal generator 172, and it can include other items 174. Sensor signal processing logic 166 illustratively receives the sensor signals from various sensors 138 and processes those signals (such as by performing linearization, filtering, amplification, etc.) and performs any other processing determined by a control algorithm that is being used by control system 152 to control machine 102 based on the sensor inputs.

Speech processing trigger detector 168 illustratively detects one or more triggers that indicate that speech processing is to be performed. For instance, trigger detector 168 may detect a voice command input by operator 116 through a microphone. It may receive an output from sensor signal processing logic 166 indicating that an alert needs to be sounded on a speaker in the user interface mechanisms 150. It may receive an input indicating that a speech command is being received by a remote user (such as one of the operators or remote users shown in FIG. 1). Once it detects a speech processing trigger, it provides a signal indicative of that to speech processing system 170.

Speech processing system 170 can include speech recognition logic 176, natural language understanding logic 178, speech synthesis logic 180, control logic 181, and it can include a wide variety of other items 182. Speech recognition logic 176 illustratively performs speech recognition on a speech input received by control system 152. The speech input may be received by operator 116 or by a remote operator or user. It illustratively generates a recognition result based on the speech input and provides that to natural language understanding logic 178 which can generate a natural language understanding result indicative of a semantic meaning of the speech input. That information can be processed by control logic 181 to identify what operator 116 intends based on the speech input. Control logic 181 can thus implement a control algorithm that is used to control machine 102 (or parts of machine 102) or other parts of the architecture 100 shown in FIG. 1, based upon a speech input by operator 116 or from another operator.

When the trigger detected by detector 168 is an input that indicates that speech processing is to include speech synthesis, for example, such that an audible, verbal message can be output to operator 116, then speech synthesis logic 180 receives information indicative of the speech to be synthesized, and generates a synthesis result that can be provided to control logic 181. Control logic 181 can then generate an output to control signal generator 172 so that it can generate a control signal controlling a speaker to play that verbal, audible speech synthesis for operator 116.

Regardless of the type of speech processing performed, control logic 181 illustratively generates an output to control signal generator 172 so that control signal generator 172 can generate the appropriate control signals based upon the speech processing results. These can be signals to control a wide variety of things.

Therefore, in one example, control signal generator 172 can include on-board control logic 184 (which, itself, can include parameter/setting identifier logic 185 and other logic 187), remote machine control logic 186, and it can include a wide variety of other items 188. On-board control logic 184 can generate control signals to control on-board items that are local to mobile construction machine 102. Remote machine control logic 186 illustratively generates control signals that can be provided through communication system 148 to control other remote machines or other remote computing systems, such as those illustrated in FIG. 1.

In one example, operator 116 may provide an operating mode speech input (or command) that indicates that operator 116 wishes machine 102 to enter a particular operating mode. Therefore, the operator may provide a speech input such as "truck loading" or "trenching." In that case, the recognized operating mode command is provided to on-board control logic 184. Parameter/setting identifier logic 185 identifies machine parameters that need to be set to enter that operational mode, and automatically sets them. Logic 184 can also control communication system 148 to transmit the relevant information to remote server computing system 108, remote user computing system 106, remote data store 110, etc. This is described in greater detail below with respect to FIG. 3C.

As other examples, it may be that operator 116 provides a voice command such as "Turn on the windshield wipers" through a microphone in machine 102. In that case, trigger detector 168 illustratively detects that the operator has provided a voice command or a speech command that needs processing. Speech recognition logic and natural language understanding logic 176 and 178, respectively, generate outputs that can be provided to control logic 181 indicating that the user wishes to have the windshield wipers turned on. In response, control logic 181 provides an output indicative of this to control signal generator 172, which, itself, can use on-board control logic 184 to control a windshield wiper subsystem to turn on the windshield wipers, so that operator 116 can have the windshield wipers turned on without needing to pause the operation of machine 102 in order to actuate a physical actuator to turn on the windshield wipers.

As another example, it may be that trigger detector 168 detects a sensor input (which may have been processed by sensor signal processing logic 166) indicating that another mobile machine 104 is in very close proximity to machine 102. Therefore, it provides an input to speech synthesis logic 180 indicating that speech synthesis logic 180 is to generate an audible, verbal warning or alert for operator 116. That information can be provided to control logic 181 which controls control signal generator 172, and on-board control logic 184, to generate an audible, verbal message through a speaker, to operator 116, indicating that mobile machine 104 is in close proximity to mobile machine 102.

Further, it may be that operator 116 provides a voice or speech input indicating that he or she wishes to communicate with another mobile machine 104, with remote user 106, with remote data sources 110, or with remote server computing system 108. In that case, trigger detector 168 detects that speech command and speech processing system 170 performs the desired speech processing on the speech command so that control logic 181 can control the control signal generator 172 (and remote machine/system control logic 186) in order to use communication system 148 to send the appropriate control signals or information to the other machines or systems or data sources shown in FIG. 1. In one example, remote machine/system control logic 186 illustratively generates an output in a desired format so that it can be sent by communication system 148 to the desired end point in architecture 100, shown in FIG. 1.

These are examples only. A wide variety of other speech services can be performed based on other triggers or in a wide variety of different ways.

Figure 3A:
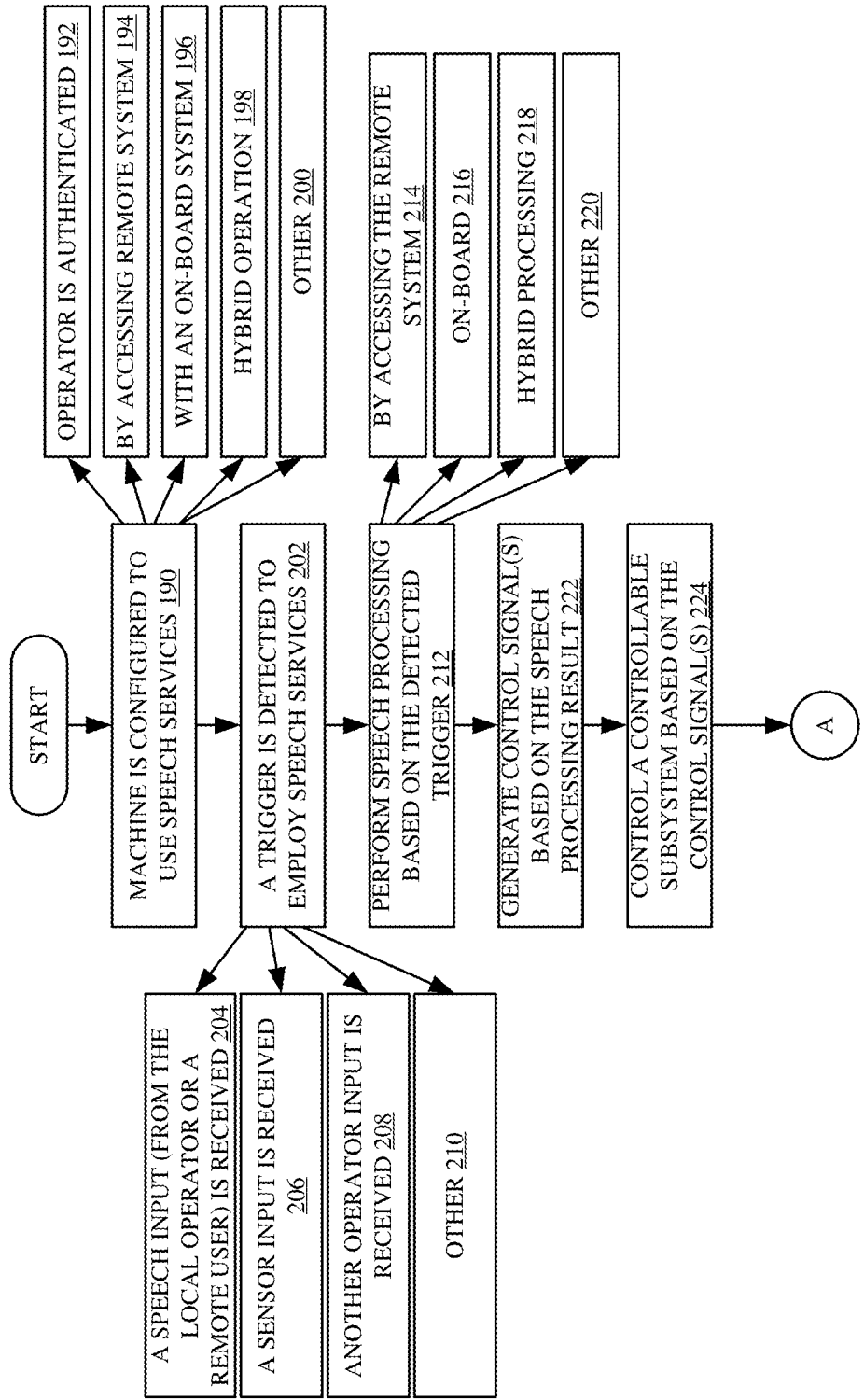
FIGS. 3A and 3B (collectively referred to herein as FIG. 3) show a flow diagram illustrating one example of the operation of the mobile construction machine shown in FIG. 2, in using speech processing.
Figure 3B:
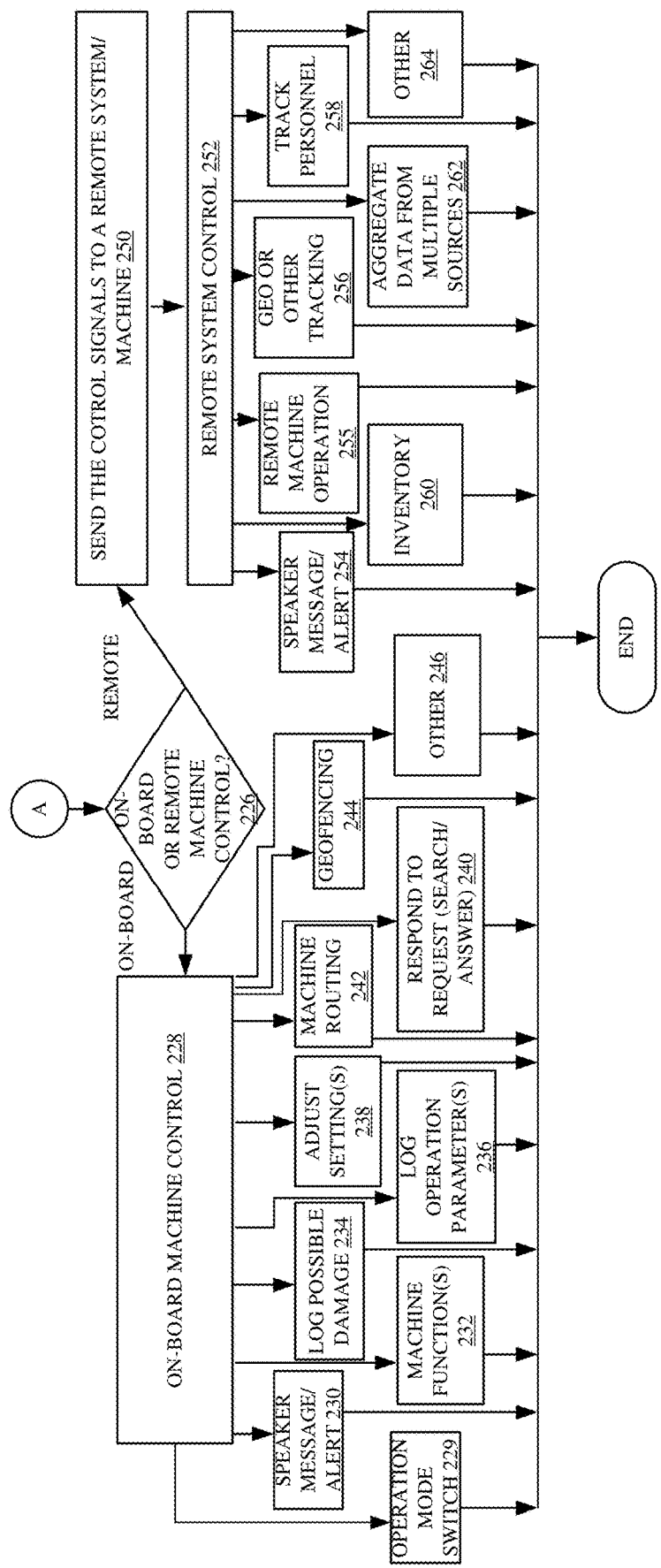

FIGS. 3A and 3B (collectively referred to herein as FIG. 3) show a flow diagram illustrating one example of the operation of the architecture 100 illustrated in FIG. 1, in more detail. FIG. 3 illustrates an example in which the operator 116 of machine 102 uses voice services. In the example, machine 102 is illustratively a mobile construction machine. It is first assumed that machine 102 is configured to use machine services. This is indicated by block 190 in the flow diagram of FIG. 3. In one example, operator 116 has authenticated himself or herself to machine 102. This is indicated by block 192. For instance, it may be that operator 116 inputs a username and password, a personal identification number, uses a smart card or other hardware protected key, or authenticates himself or herself to machine 102 in other ways. Also, in one example, it may be that operator 116 logs onto a remote server computing system 108 and authenticates to that system as well. For instance, it may be that management system 128 contains a record of machines that operator 116 is authorized to operate. When operator 116 authenticates himself or herself to machine 102, the operator, or the machine, or both, can communicate with remote server computing system 108 and authenticate through management system 128, or through another authentication system, to ensure that operator 116 has authorization or permission to operate machine 102.

Also, in one example, machine 102 can be configured to use speech services in a variety of different ways. For instance, it can be configured to access speech processing system 126 in remote server computing system 108. This is indicated by block 194 in FIG. 3. By way of example, it may be that control system 152 has a client side or machine side component that controls communication system 148 to access speech processing system 126 in remote server computing system 108 whenever speech recognition (or another speech service) needs to be performed. It can send speech information indicative of the speech to be recognized (or other speech service to be performed) to speech processing system 126, and it can receive a speech recognition result.

In another example, and as discussed above with respect to FIG. 2, machine 102 can be configured with its own speech processing system 170. This is indicated by block 196. In that case, speech processing system 170 can perform the speech processing (such as speech recognition, natural language understanding, speech synthesis, etc.) that are used by machine 102.

In yet another example, machine 102 can be configured for hybrid operation. This is indicated by block 198. By way of example, speech processing may be divided into different categories of tasks. Those categories of tasks can be performed at two different locations. For instance, some may be performed by speech processing system 170 on machine 102, while others may be performed by speech processing system 126 at remote server computing system 108. Performing some speech processing tasks on-board machine 102 and performing others at remote server computing system 108 is sometimes referred to as hybrid operation. The machine 102 can be configured to use speech services in a wide variety of other ways as well. This is indicated by block 200.

At some point during the operation of machine 102, speech processing trigger detector 168 illustratively detects a trigger to employ the speech services. This is indicated by block 202. There can be a wide variety of different triggers that can be used to initiate speech services. For instance, it may be that a speech input is received from operator 116 (or from an operator such as operator 120 of a remote machine) that needs to be recognized. Receiving a speech input from an operator that needs to be recognized is indicated by block 204.

In addition, it may be that some sensor signals from sensors 138 may trigger speech services. By way of example, when a proximity sensor senses that machine 102 is in close proximity to another machine (or when position signals from geographic position sensors indicate this), or to another object where a collision is possible, that sensor signal may trigger speech processing system 120 to play a synthesized message for operator 116 alerting operator 116 his or her machine's proximity to the other machine or object. In another example, may be that machine 102 is only to operate within a certain geographic boundary. If sensor 138 is a geographic position sensor, and it senses that machine 102 is approaching that boundary, or has crossed the boundary, it again may trigger speech processing system 120 to play a synthesized message to operator 116 indicating that machine 102 is approaching, or has crossed, the geographic boundary. The sensors may also indicate a wide variety of different operating parameters, such as whether machine 102 is operating within a desired range (e.g., if machine 102 is a grader, it may sense whether the grader is operating at a desired grade level, etc.), it may sense soil characteristics (such as soil moisture), machine parameters or variables, or a wide variety of other items. These sensed variables may provide inputs to sensor signal processing logic 166 that cause sensor signal processing logic 166 to generate a suggested change in operating parameters, machine settings, machine configuration, etc. That information can be output to speech processing system 170 and a synthesized message can be played for operator 116 suggesting a settings change, a machine configuration change, or another operational parameter change for machine 102. The machine can be automatically controlled to make those changes and a speech output can be generated to notify the operator of the change. These are just examples of sensor inputs that can trigger speech processing services and examples of services that can be performed, and a wide variety of others can be used as well. Using a sensor input to trigger speech processing services is indicated by block 206 in the flow diagram of FIG. 3.

It may also be that operator 116 provides another input, through another user interface mechanism 150, and this may trigger speech services. Triggering speech services based on another operator input is indicated by block 208.

It will be appreciated that these are just examples of how speech services can be triggered. They can be triggered in a wide variety of other ways as well. This is indicated by block 210.

Control system 152 then performs speech processing based on the detected trigger. This is indicated by block 212. It can do this by using communication system 148 to access the remote speech processing system 126 in remote server computing system 108. Accessing remote speech services is indicated by block 214. It can perform speech services using on-board speech processing system 170. This is indicated by block 216. It can use both on-board speech processing system 170 and remote speech processing system 126 in hybrid operation. This is indicated by block 218. It can use other configurations or other architectures to perform speech processing as well. This is indicated by block 220.

When the speech processing is finished (either by speech processing system 126 in remote server computing system 108, or in the on-board speech processing system 170) a speech processing result is obtained. The speech processing result may be the result of speech recognition, natural language understanding, speech synthesis, etc. This result is used by control logic 181 to control signal generator 172 to generate a control signal, according to a control algorithm or other mechanism or logic. Generating a control signal based on the speech processing result is indicated by block 222 in the flow diagram of FIG. 3.

Control signal generator 172 can use on-board control logic 184 to generate a control signal to control an on-board controllable subsystem 154. Alternatively, or in addition, it can use remote machine control logic 186 to generate a control signal that is to be sent to another machine (such as machine 104), to another computing system (such as one or more of computing systems 106 and 108) or to a remote data store 110. The control signal can be used to control operations of a remote machine (such as to adjust settings on a remote machine, generate an alert on a remote machine, etc.) or to control a remote computing system or a remote data store to perform operations on those systems or to store information in that data store. Controlling a controllable subsystem based on the control signals is indicated by block 224 in the flow diagram of FIG. 3.

A number of examples of both on-board and remote control signals that can be generated based on a speech recognition result will now be described. It will be appreciated that these are examples only. In one example, operator 116 provides a speech input indicating a desired switch to an operating mode spoken by operator 116. Thus, on-board machine control is to be performed, as indicated by blocks 226 and 228 in the flow diagram of FIG. 3. On-board control logic 184 can use parameter setting identifier logic 185 to identify machine parameters or settings that are to be used in the operational mode and can control the controllable subsystems 154 to automatically set those parameters/settings. This is indicated by block 229 in FIG. 3 and is described in greater detail below with respect to FIG. 3C.

In another example, logic 184 can generate, for instance, a speech synthesis signal and provide it to a speaker in user interface mechanisms 150 so that a speaker message or a spoken alert message can be played for operator 116. This is indicated by block 230.

If the speech processing result is a speech recognition result indicative of a control input spoken by operator 116, then on-board control logic 184 can generate a control signal to control machine functions of one or more controllable subsystems 154. This is indicated by block 232. For instance, operator 116 may say "Turn on the windshield wipers", or provide another spoken input to control a controllable subsystem. Operator 116 can also provide a more complicated input such as "Change the grade level to X", "Repeat dig and dump operations", or a wide variety of other spoken inputs that result in control signals that on-board control logic 184 uses to control one or more controllable subsystems 154.

It may also be that operator 116 has spoken a natural language input indicating something that is to be recorded, such as possible damage to machine 102. For instance, operator 116 may say "I just heard a loud thump coming from the transmission". Or another input that triggers trigger detector 168 and causes speech processing system 170 to perform speech recognition and to log that information, such as in data store 146, or to send it to remote server computing system 108 for storage or further analysis, or to send it to other remote data stores 110 or remote user computing system 106, etc. Logging possible damage is indicated by block 234 in the flow diagram of FIG. 3.

The operator 116 may provide a spoken input indicating other operational parameters as well, so that they can be logged. Logging other operational parameters is indicated by block 236.

Any of the operators in the architectures shown in FIG. 1 can provide a spoken input to adjust settings. The settings can be adjusted on the operator's own machine, or they can be on a remote machine. By way of example, it may be that remote user 134 provides a spoken input to adjust settings on mobile machine 102. In that case, one of the speech processing systems in architecture 100 (e.g., system 123 or 126) will perform speech recognition and natural language understanding on that input and use a control system (e.g., remote machine control logic 125) to generate control signals to change the settings on the target machine. Generating control signals to adjust settings is indicated by block 238.

It may be that operator 116 requests information, such as machine performance information, fuel consumption information, or a wide variety of other types of information. In that case, on-board control logic 184 illustratively generates control signals to access data which may be stored in data store 146 and to then control speech synthesis logic 180 to synthesize a spoken response returning the accessed data. For instance, it may be that operator 116 makes a spoken request such as "What is my current fuel efficiency rating". In response, on-board control logic 184 can access the fuel consumption and other efficiency data from data store 146 so that the fuel efficiency can be computed (such as by control logic 181 or logic 184). The result of that computation can then be provided to speech synthesis logic 180 which can synthesize a spoken response to operator 116 indicating the operator's current fuel efficiency rating. Again, this is only one example of how on-board control logic can respond to a request from operator 116. Responding to a request is indicated by block 240 in the flow diagram of FIG. 3.

The on-board control logic 184 can also generate control signals to control a routing subsystem to set or modify machine routes for machine 102. By way of example, it may be that operator 116 provides an input indicating a new route. Speech processing system 170 then recognizes that command and changes or sets the machine route. This is indicated by block 242.

It may also be that on-board control logic 184 uses speech processing to enforce geo-fencing. For instance, it may be that operator 116 provides a spoken input such as "Alert me when I am approaching the boundary of the geo-fence." Then when trigger detector 168 detects the position of mobile machine 102 (based upon the output from a position sensor 138) and determines that the machine is approaching the geographical boundary (such as by comparing the current position, heading and speed to a pre-defined geofence location), it can generate a speech synthesis result that alerts operator 116 with a spoken message such as "You are within 100 meters of the geo-fence." This is an example of how the on-board control logic 184 can be used to enforce geo-fencing based on speech services. This is indicated by block 244 in the flow diagram of FIG. 3.

On-board control logic 184 can generate control signals to generate a wide variety of other functions or operations of machine 102 based on a speech processing result. This is indicated by block 246.

If, at block 226, the control signals are to be used to control a remote machine or system, then the control signals are sent by communication system 148 to the remote system or machine to be controlled. This is indicated by block 250 in the flow diagram of FIG. 3. Remote system control (or remote machine control) is then performed based upon the control signals. This is indicated by block 252. A number of examples will now be discussed. It may be that the control signals sent from machine 102 can be sent to control a speaker on mobile machine 104. By way of example, it may be that operator 116 has observed a problem with machine 104, when machine 102 and machine 104 are operating in close proximity to one another. The operator 116 may provide a spoken input such as "I am approaching your vehicle from the rear. Please beware." Speech processing system 170 can generate a speech recognition result and a natural language understanding result based upon the spoken input and use remote machine/system control logic 186 to generate control signals that are sent by communication system 148 to play an alert (or the spoken message) on a speaker in machine 104, for operator 120. Generating control signals to control a speaker to play a message or alert on a remote system or machine is indicated by block 254.

Operator 116 can also provide a spoken input so that a remote user, such as remote user 134, can track the geographic position of machine 102, or can track other items corresponding to machine 102. For instance, operator 116 may provide a spoken input such as "Send the manager my current position", or "Send the manager my performance information", etc. In response, speech processing system 170 can generate a speech recognition result and a natural language understanding result corresponding to that spoken input and use remote machine/system control logic 186 to obtain the information to be sent to the manager (such as from data store 146 or elsewhere), and send it to the manager (e.g., remote user computing system 106) using communication system 148. Sending geographic or other tracking information is indicated by block 256.

The speech processing can also be used to track personnel. For instance, it may be that the speech processing system 123 is on a remote user computing system 106. In that case, remote user 134 may provide a spoken input such as "Where are all of my operators?". The speech processing system 123 can generate a speech recognition result and personnel tracking logic 127 can then first access management system 128 to identify which particular machines remote user 134 is responsible for, and then to use communication system 135 to send messages to each of those machines to obtain their geographical position. That information can then be aggregated by data aggregation logic 131 and used to generate a message to remote user 134 indicative of the geographic location of each of the operators. This is indicated by block 258.

Remote user 134 can also control operation of machines 102-104 using a speech input. The speech input can be recognized by speech processing system 123. The recognition result can be provided to remote machine control logic 125 which generates control signals and sends them, using communication system 135, to the target machine(s) 102-104. This is indicated by block 255.

In another example, the voice services can be used to track inventory. For instance, remote user 134 may provide a spoken input such as "How many machines will need servicing today?". This is recognized by speech processing system 123. Based on the recognition result, inventory tracking logic 129 can then access the maintenance records for the various machines that are assigned to remote user 134 to determine which of them will need maintenance, what types of maintenance they will need, and various inventory items that may be consumed in performing that maintenance. This can be done by accessing management system 128 in remote server computing system 108, or in other ways. Tracking inventory using voice services is indicated by block 260 in the flow diagram of FIG. 3.

Also, remote machine/system control logic 186 can generate control signals to aggregate data from a variety of different remote data sources and present that data for the requesting operator or user. For example, it may be that user 134 is providing a request to obtain information. For instance, it may be that remote user 134 provides a spoken input into speech processing system 123 on remote user computing system 106 (which may be similar to or different from speech processing system 170) indicating a desire to obtain performance information for a plurality of different machines. The performance information may include information that is stored on a plurality of different remote machines 102-104 or data sources, and therefore remote user 134 would normally need to perform a variety of different data acquisition steps in order to obtain the data from those remote sources. However, in one example, on remote user computing system 106 may include data aggregation logic 131 that generates control signals to control a communication system to communicate a request for the relevant data to all of the various different remote data sources where it resides. It can then aggregate that data and provide it to the remote user 134. This is indicated by block 262 in the flow diagram of FIG. 3.

Remote machine/system control logic 186 can generate a wide variety of other control signals to control remote machines or systems based on voice input. This is indicated by block 264 in the flow diagram of FIG. 3.

Figure 3C:
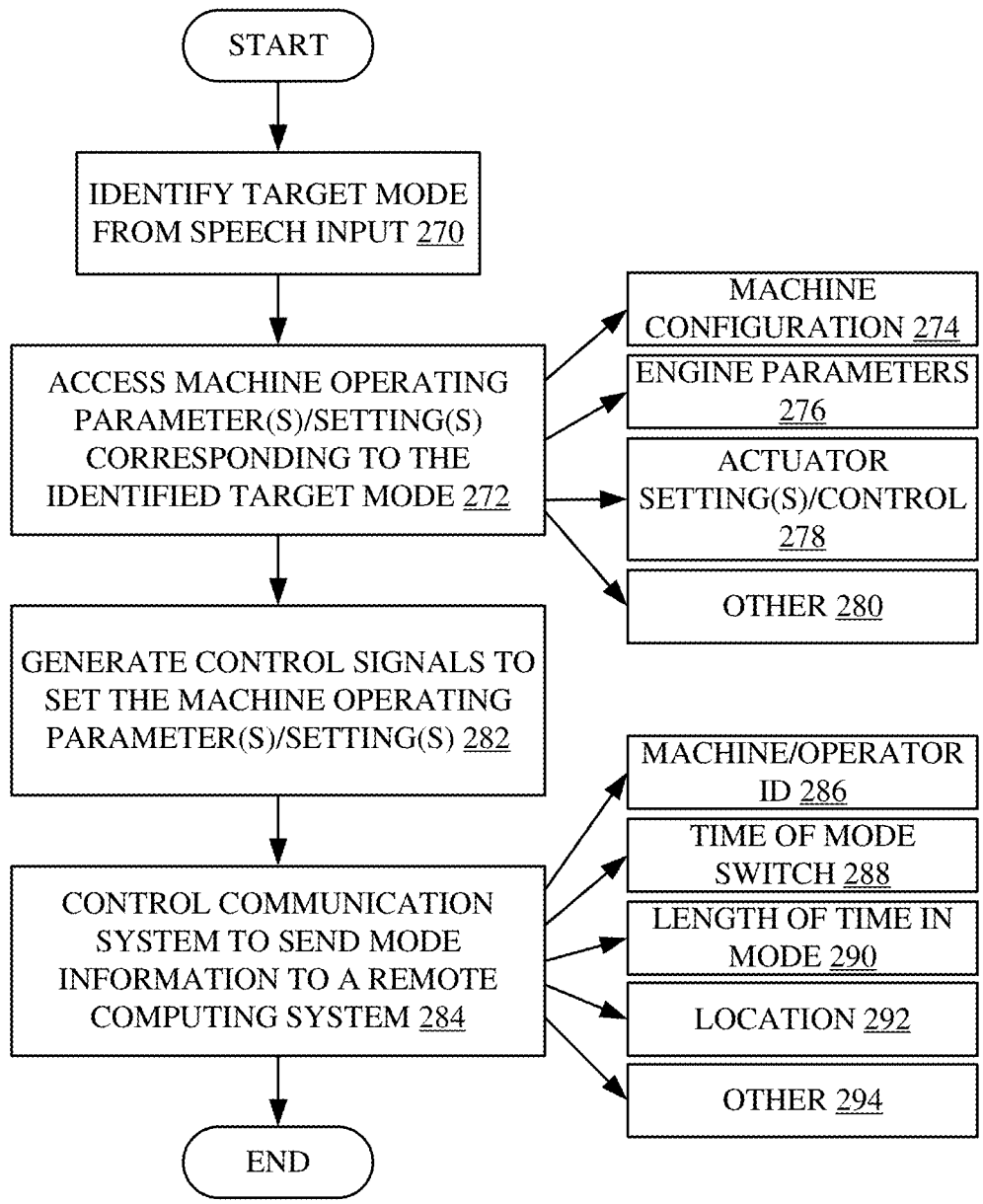
FIG. 3C is a flow diagram showing an operation in which an operational mode switch is indicated by a speech input.

FIG. 3C is a flow diagram illustrating one example of the operation of machine 102 in processing a speech input indicating that machine 102 is to begin operating in a particular operating mode. The speech input illustratively identifies the mode of operation and control system 102 illustratively generates control signals to automatically adjust any machine parameters or settings to place machine 102 in condition to operate in the identified operating mode.

For purposes of the present description, an operating mode can, for instance, be a mode of operation for which there are a known set of machine parameters and/or settings. By way of example, if an excavator is in a "truck loading" operating mode, this may mean that certain actuators and engine parameters or other machine parameters or settings are to be set, in order to operate in that mode. On the other hand, if the excavator is in another operating mode, such as "trenching", then this may mean that the actuators and engine settings or parameters are set differently. The correspondence between a given operating mode and the values for actuator control, engine parameters or settings and/or other parameters or settings can be indicated in a variety of different ways. For instance, each operating mode can be mapped to the corresponding actuator, engine and other machine settings or parameters by a mapping stored in data store 146, or elsewhere. In another example, the correspondence between the operating mode and the values for the actuator, engine and/or other machine settings or parameters can be identified dynamically based on a wide variety of different criteria.

In FIG. 3C, it is assumed that a speech input is received that identifies a particular operating mode that machine 102 is to operate in (e.g., a target operating mode). The identified operating mode may be different from a current operating mode so that the operation of machine 102 is to switch from a current operating mode to the target operating mode. In that case, speech processing logic 170 identifies the target operating mode and control logic 181 generates a signal indicative of this and provides it to control signal generator 172. Identifying the target operating mode is indicated by block 270 in FIG. 3C.

Parameter/setting identifier logic 185 then obtains the values for machine settings/parameters corresponding to the identified target mode of operation. This is indicated by block 272 in the flow diagram of FIG. 3C. As mentioned above, the values can be obtained by accessing a mapping in data store 146, or elsewhere. The values can be identified dynamically or in other ways as well.

The values corresponding to the identified mode of operation can identify a particular machine configuration that machine 102 is to be placed in, based on the identified operating mode. This is indicated by block 274. They can identify engine parameters (e.g., speed, etc.), as indicated by block 276. They can identify actuator positions, the positions of control input mechanisms (e.g., the position of actuator controllers, a throttle, etc.). This is indicated by block 278. They can indicate a wide variety of other parameter/setting/configuration values as well. This is indicated by block 280.

On-board control logic 184 then generates control signals to control the controllable subsystems 154 to set the settings/parameters/configuration values to the identified values. This is indicated by block 282 in the flow diagram of FIG. 3C. For instance, logic 184 can generate actuator control signals to automatically set actuators (or otherwise automatically control them) on machine 102 based on the obtained setting/parameter/actuator values. It can automatically position a throttle or other control input mechanism. It can automatically set engine parameters or settings and/or other machine settings or parameters. By automatically, it is meant that the actions can be taken without further operator involvement, except perhaps to initiate them, or authorize them.

On-board control logic 184 also illustratively controls communication system 148 to send the mode information to remote computing system 106, 108, and or remote data store 110. This is indicated by block 284 in the flow diagram of FIG. 3C. The mode information can include a wide variety of different types of information. For example, it can include a machine and/or operator identifier 286. It can include a time indicator 288 indicating a time when the target mode of operation was entered by machine 102. It can include a length of time indicator indicating a length of time that the machine 102 operated in the target mode or a previous mode of operation or both. This is indicated by block 290. It can include a location indicator that identifies a location of the machine 102. This is indicated by block 292. The mode information can include a wide variety of other mode information as well, and this is indicated by block 294.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

In the example shown in FIG. 1, machines 102 and 104 can communicate with elements in a remote server architecture. In such an example the remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 1 and 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

Also, the data discussed above can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machines 102, 104 come close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machines 102, 104 until they enter a covered location. The machines, themselves, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
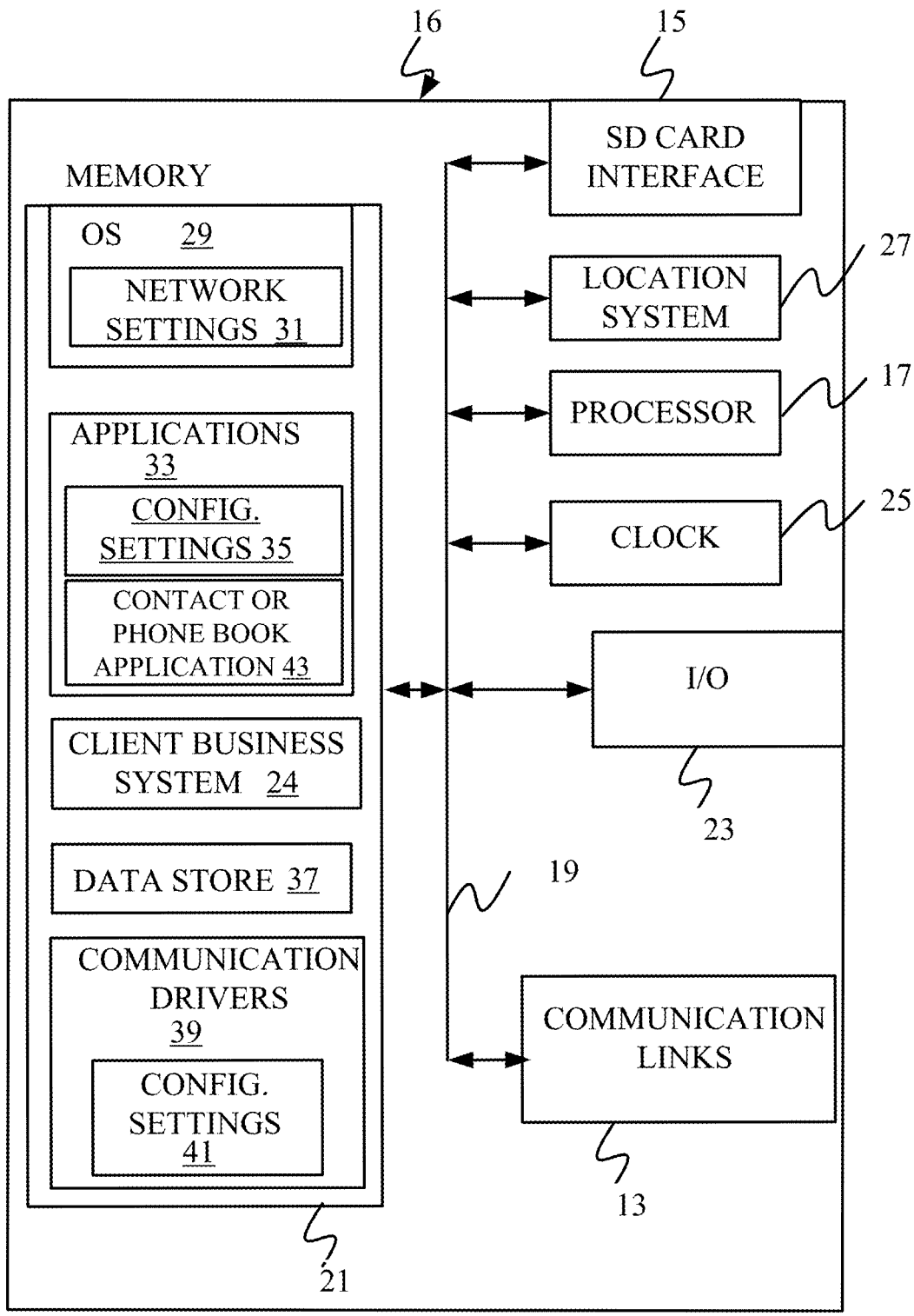
FIGS. 4-6 show examples of mobile devices that can be used in the architectures shown in the previous figures.
Figure 5:
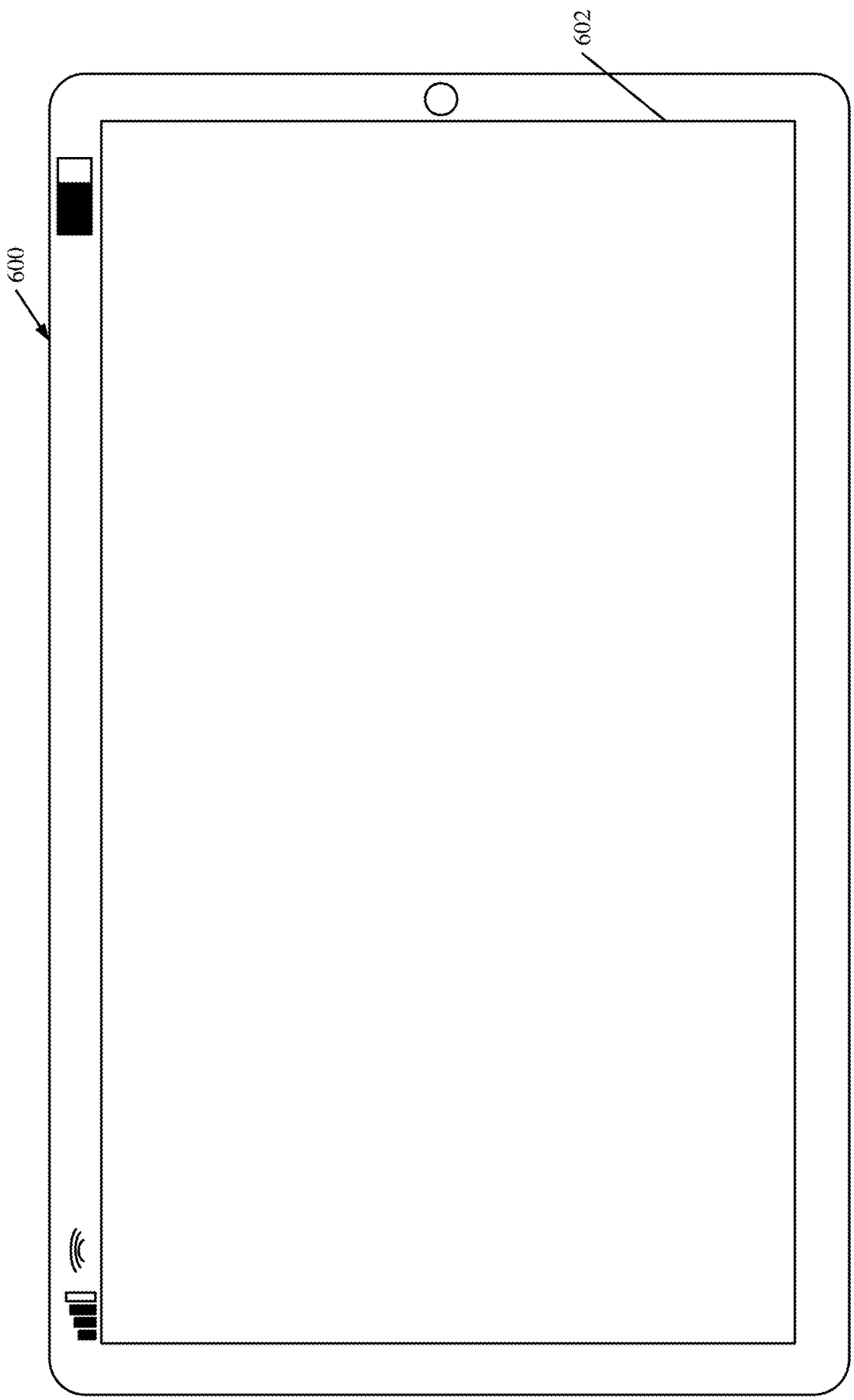
Figure 6:
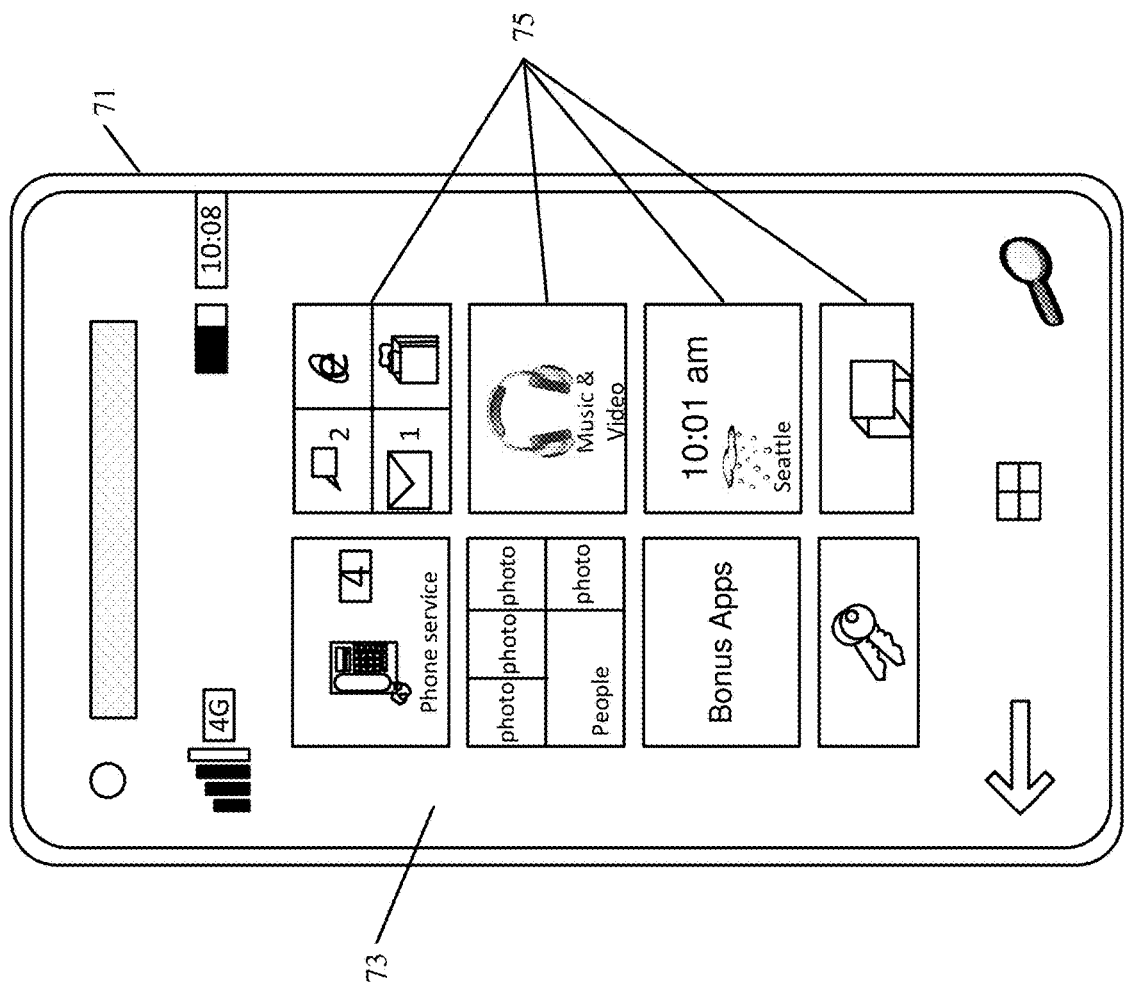

FIG. 4 is a simplified block diagram of one illustrative example of a handheld or mobile computing device that can be used as a user's or client's hand held device 16, in which the present system (or parts of it) can be deployed. For instance, a mobile device can be deployed in the operator compartment of machines 102, 104 for use in generating, processing, playing or displaying or otherwise surfacing the information discussed above. FIGS. 5-6 are examples of handheld or mobile devices.

FIG. 4 provides a general block diagram of the components of a client device 16 that can run some components shown in FIGS. 1 and 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from FIGS. 1 and 2) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 5 shows one example in which device 16 is a tablet computer 600. In FIG. 5, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
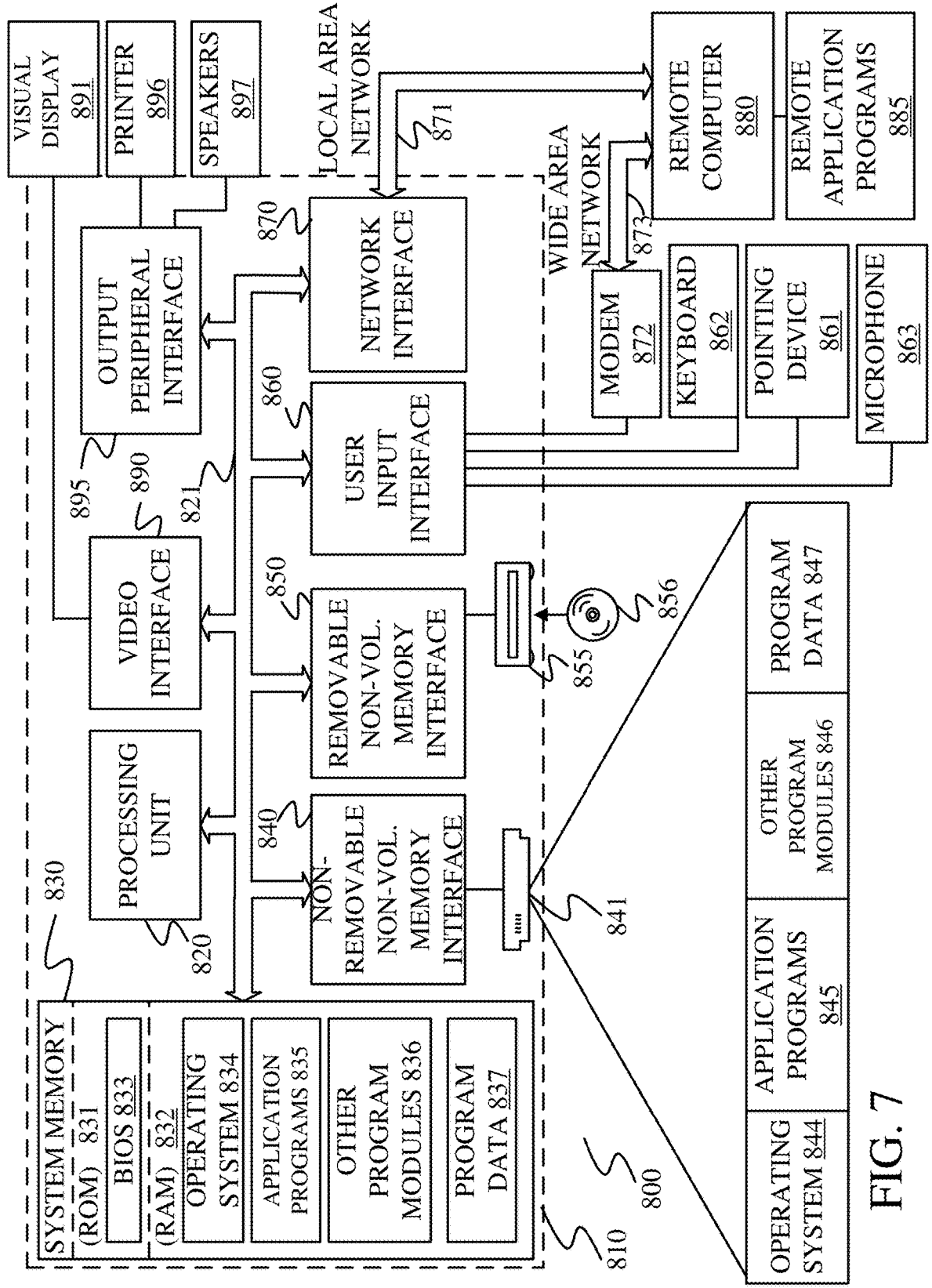
FIG. 7 is a block diagram of one example of a computing environment that can be used in the architectures shown in the previous figures.

FIG. 7 is one example of a computing environment in which elements of FIGS. 1 and 2, or parts of them, (for example) can be deployed. With reference to FIG. 7, an example system for implementing some embodiments includes a general-purpose computing device in the form of a computer 810. Components of computer 810 may include, but are not limited to, a processing unit 820 (which can comprise processor or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 2 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile construction machine, comprising:
an operator interface receiving a mode change speech input from an operator, the mode change speech input identifying a target mode of operation;
a controllable subsystem;
a speech processing system that generates a speech recognition result based on the mode change speech input; and
a control signal generator that automatically generates a control signal to control the controllable subsystem to set machine operating parameters on the mobile construction machine, corresponding to the target mode of operation, based on the speech recognition result.

Example 2 is the mobile construction machine of any or all previous examples wherein the control signal generator comprises:
parameter/setting identifier logic configured to identify the machine operating parameters based on the target mode of operation.

Example 3 is the mobile construction machine of any or all previous examples wherein the parameter/setting identifier logic is configured to identify the machine operating parameters based on the target mode of operation by accessing a mapping that maps the machine operating parameters to the target mode of operation.

Example 4 is the mobile construction machine of any or all previous examples and further comprising:
a communication system, wherein the control signal generator is configured to control the communication system to send mode information, indicative of the mobile construction machine switching to operation in the target mode of operation, to a remote computing system, over a network.

Example 5 is the mobile construction machine of any or all previous examples wherein the control signal generator is configured to automatically generate the control signals to control a machine configuration of the mobile construction machine based on the target mode of operation.

Example 6 is the mobile construction machine of any or all previous examples wherein the control signal generator is configured to automatically generate the control signals to control engine parameters for an engine on the mobile construction machine based on the target mode of operation.

Example 7 is the mobile construction machine of any or all previous examples wherein the control signal generator is configured to automatically generate the control signals to control an actuator on the mobile construction machine based on the target mode of operation.

Example 8 is the mobile construction machine of any or all previous examples and further comprising:
a speech processing trigger detector configured to generate a speech processing trigger signal based on receiving the mode change speech input, the speech processing trigger signal triggering operation of the speech processing system.

Example 9 is the mobile construction machine of any or all previous examples and further comprising:
a data store, accessible by the parameter/setting identifier logic, that stores the mapping that maps the machine operating parameters to the target mode of operation.

Example 10 is a computer implemented method of controlling a mobile construction machine, the method comprising:
receiving a mode change speech input from an operator, the mode change speech input identifying a target mode of operation;
generating a speech recognition result based on the mode change speech input; and automatically generating a control signal to control a controllable subsystem on the mobile construction machine to set machine operating parameters on the mobile construction machine, corresponding to the target mode of operation, based on the speech recognition result.

Example 11 is the method of any or all previous examples wherein automatically generating a control signal generator comprises:
identifying the machine operating parameters based on the target mode of operation by accessing a mapping that maps the machine operating parameters to the target mode of operation.

Example 12 is the method of any or all previous examples wherein the mobile construction machine includes a data store that stores the mapping and wherein identifying the machine operating parameters based on the target mode of operation comprises:
accessing the data store that stores the mapping that maps the machine operating parameters to the target mode of operation to identify the machine operating parameters.

Example 13 is the method of any or all previous examples wherein automatically generating a control signal comprises:
generating the control signal to control a communication system to send mode information, indicative of the mobile construction machine switching to operation in the target mode of operation, to a remote computing system, over a network.

Example 14 is the method of any or all previous examples wherein automatically generating the control signal comprises:
automatically generating the control signals to control a machine configuration of the mobile construction machine based on the target mode of operation.

Example 15 is the method of any or all previous examples wherein automatically generating the control signal comprises:
automatically generating the control signals to control engine parameters for an engine on the mobile construction machine based on the target mode of operation.

Example 16 is the method of any or all previous examples wherein automatically generating the control signal comprises:
automatically generating the control signals to control an actuator on the mobile construction machine based on the target mode of operation.

Example 17 is the method of any or all previous examples wherein automatically generating the control signal comprises:
automatically generating the control signals to control the controllable subsystems to perform operations in the target mode of operation.

Example 18 is a control system for controlling a mobile construction machine, the control system comprising:
a computer processor;
a speech processing system that receives a mode change speech input from an operator, the mode change speech input identifying a target mode of operation, and that generates a speech recognition result based on the mode change speech input; and
a control signal generator that automatically generates a control signal to control a controllable subsystem to set machine operating parameters on the mobile construction machine, corresponding to the target mode of operation, based on the speech recognition result.

Example 19 is the control system of any or all previous examples wherein the control signal generator comprises:
parameter/setting identifier logic configured to identify the machine operating parameters based on the target mode of operation.

Example 20 is the control system of any or all previous examples wherein the control signal generator is configured to control a communication system on the mobile construction machine to send mode information, indicative of the mobile construction machine switching to operation in the target mode of operation, to a remote computing system, over a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile construction machine, comprising:
a controllable subsystem;
a communication system;
at least one computer processor;
memory storing instructions executable by the at least one computer processor, wherein the instructions, when executed, cause the mobile construction machine to:
receive a mode change speech input from an operator, the mode change speech input identifying a target mode of operation;
generate a speech recognition result based on the mode change speech input; and
automatically generate a control signal to control the controllable subsystem to set machine operating parameters on the mobile construction machine, corresponding to the target mode of operation, based on the speech recognition result
control the communication system to send mode information, indicative of the mobile construction machine switching to operation in the target mode of operation, to a remote computing system over a network, the mode information including a time indicator indicating a time when the target mode of operation was entered by the mobile construction machine.

2. The mobile construction machine of claim 1 wherein the instructions cause the mobile construction machine to:
identify the machine operating parameters based on the target mode of operation.

3. The mobile construction machine of claim 2 wherein the instructions cause the mobile construction machine to identify the machine operating parameters based on the target mode of operation by accessing a mapping that maps the machine operating parameters to the target mode of operation.

4. The mobile construction machine of claim 1, wherein the mode information includes:
an operator identifier that identifies the operator of the mobile construction machine; and
a length of time indicator indicating a length of time that the mobile construction machine operated in the target mode of operation.

5. The mobile construction machine of claim 2 wherein the instructions cause the mobile construction machine to automatically generate the control signals to control a machine configuration of the mobile construction machine based on the target mode of operation.

6. The mobile construction machine of claim 2 wherein the instructions cause the mobile construction machine to automatically generate the control signals to control engine parameters for an engine on the mobile construction machine based on the target mode of operation.

7. The mobile construction machine of claim 2 wherein the instructions cause the mobile construction machine to automatically generate the control signals to control an actuator on the mobile construction machine based on the target mode of operation.

8. The mobile construction machine of claim 1 wherein the instructions cause the mobile construction machine to:
generate a speech processing trigger signal based on receiving the mode change speech input, the speech processing trigger signal triggering operation of the speech processing system.

9. The mobile construction machine of claim 1, wherein the mode information comprises:
a machine identifier that identifies the mobile construction machine; and
a location indicator that identifies a location of the mobile construction machine.

10. A computer implemented method of controlling a mobile construction machine, the method comprising:
receiving a mode change speech input from an operator, the mode change speech input identifying a target mode of operation; sending a representation of the mode change speech input to a remote server computing system, located remotely from the mobile construction machine;
receiving a speech recognition result generated by the remote server computing system based on the representation of the mode change speech input; and
automatically generating a control signal to control a controllable subsystem on the mobile construction machine to set machine operating parameters on the mobile construction machine, corresponding to the target mode of operation, based on the speech recognition result.

11. The method of claim 10 wherein automatically generating a control signal generator comprises:
identifying the machine operating parameters based on the target mode of operation by accessing a mapping that maps the machine operating parameters to the target mode of operation.

12. The method of claim 11 wherein the mobile construction machine includes a data store that stores the mapping and wherein identifying the machine operating parameters based on the target mode of operation comprises:
accessing the data store that stores the mapping that maps the machine operating parameters to the target mode of operation to identify the machine operating parameters.

13. The method of claim 11 wherein automatically generating a control signal comprises:
generating the control signal to control a communication system to send mode information, indicative of the mobile construction machine switching to operation in the target mode of operation, to a remote computing system, over a network.

14. The method of claim 10 wherein automatically generating the control signal comprises:
automatically generating the control signals to control a machine configuration of the mobile construction machine based on the target mode of operation.

15. The method of claim 10 wherein automatically generating the control signal comprises:
automatically generating the control signals to control engine parameters for an engine on the mobile construction machine based on the target mode of operation.

16. The method of claim 10 wherein automatically generating the control signal comprises:
automatically generating the control signals to control an actuator on the mobile construction machine based on the target mode of operation.

17. The method of claim 10 wherein automatically generating the control signal comprises:
automatically generating the control signals to control the controllable subsystems to perform operations in the target mode of operation.

18. A control system for controlling a mobile construction machine, the control system comprising:
at least one computer processor;
memory storing instructions executable by the at least one computer processor, wherein the instructions, when executed, cause the control system to:
receive a mode change speech input from an operator, the mode change speech input identifying a target mode of operation;
send a representation of the mode change speech input to a remote server computing system, located remotely from the mobile construction machine;
receive a speech recognition result generated by the remote server computing system based on the representation of the mode change speech input; and
automatically generate a control signal to control a controllable subsystem to set machine operating parameters on the mobile construction machine, corresponding to the target mode of operation, based on the speech recognition result.

19. The control system of claim 18 wherein the instructions cause the control system to:
identify the machine operating parameters based on the target mode of operation.

20. The control system of claim 18 wherein the instructions cause the control system to control a communication system on the mobile construction machine to send mode information, indicative of the mobile construction machine switching to operation in the target mode of operation, to a remote computing system, over a network.

* * * * *